(12) United States Patent  
Van Aert et al.

(10) Patent No.: US 11,708,505 B2
(45) Date of Patent: *Jul. 25, 2023

(54) AQUEOUS POLYURETHANE RESIN DISPERSION

(71) Applicant: AGFA NV, Mortsel (BE)

(72) Inventors: Hubertus Van Aert, Mortsel (BE); Ellen Bertels, Mortsel (BE)

(73) Assignee: AGFA NV, Mortsel (BE)

( * ) Notice: Subject to any disclaimer, the term of this patent is extended or adjusted under 35 U.S.C. 154(b) by 382 days.

This patent is subject to a terminal disclaimer.

(21) Appl. No.: 16/766,304

(22) PCT Filed: Nov. 27, 2018

(86) PCT No.: PCT/EP2018/082628
§ 371 (c)(1),
(2) Date: May 22, 2020

(87) PCT Pub. No.: WO2019/105904
PCT Pub. Date: Jun. 6, 2019

(65) Prior Publication Data
US 2020/0369881 A1 Nov. 26, 2020

(30) Foreign Application Priority Data
Nov. 28, 2017 (EP) ..................... 17203985

(51) Int. Cl.
C09D 11/40 (2014.01)
C08G 18/12 (2006.01)
C08G 18/32 (2006.01)
C08G 18/42 (2006.01)
C08G 18/48 (2006.01)
C08G 18/66 (2006.01)
C08G 18/75 (2006.01)
C08K 3/22 (2006.01)
C09D 11/102 (2014.01)
C09D 11/322 (2014.01)
C09D 11/54 (2014.01)
C08K 3/013 (2018.01)
C08G 18/08 (2006.01)
C08G 18/50 (2006.01)
C08G 18/72 (2006.01)
C08L 75/08 (2006.01)
C09D 17/00 (2006.01)
C08G 18/10 (2006.01)
C08G 18/24 (2006.01)
C08G 18/40 (2006.01)
(Continued)

(52) U.S. Cl.
CPC .......... *C09D 11/40* (2013.01); *C08G 18/0814* (2013.01); *C08G 18/10* (2013.01); *C08G 18/12* (2013.01); *C08G 18/246* (2013.01); *C08G 18/3206* (2013.01); *C08G 18/4018* (2013.01); *C08G 18/4213* (2013.01); *C08G 18/4227* (2013.01); *C08G 18/4825* (2013.01); *C08G 18/4833* (2013.01); *C08G 18/5021* (2013.01); *C08G 18/6622* (2013.01); *C08G 18/6655* (2013.01); *C08G 18/72* (2013.01); *C08G 18/755* (2013.01); *C08K 3/013* (2018.01); *C08K 3/22* (2013.01); *C08L 75/08* (2013.01); *C09D 11/102* (2013.01); *C09D 11/322* (2013.01); *C09D 11/54* (2013.01); *C09D 17/008* (2013.01); *C09D 175/06* (2013.01); *C09D 175/08* (2013.01); *C08K 2003/2241* (2013.01)

(58) Field of Classification Search
CPC ................ C08G 18/12; C08G 18/3206; C08G 18/4213; C08G 18/4833; C08G 18/6622; C08G 18/6655; C08G 18/755; C08G 18/0814; C08G 18/4227; C08G 18/4825; C08G 18/5021; C08G 18/72; C08G 18/10; C08G 18/246; C08G 18/4018; C08K 3/22; C08K 3/013; C08K 2003/2241; C08L 75/08; C09D 11/40; C09D 11/102; C09D 11/322; C09D 11/54; C09D 17/008; C09D 175/06; C09D 175/08

See application file for complete search history.

(56) References Cited

U.S. PATENT DOCUMENTS

| 3,686,108 A | 8/1972 | Reiff et al. |
| 2008/0090949 A1 | 4/2008 | Nagao et al. |
| 2009/0233065 A1 | 9/2009 | Komatsu |

FOREIGN PATENT DOCUMENTS

| CA | 2862378 | * | 9/2013 |
| CN | 1961015 A | | 5/2007 |
| CN | 103314025 A | | 9/2013 |

(Continued)

OTHER PUBLICATIONS

Official Communication issued in International Patent Application No. PCT/EP2018/082628, dated Feb. 13, 2019.

(Continued)

Primary Examiner — Patrick D Niland
(74) Attorney, Agent, or Firm — Leydig, Voit & Mayer, Ltd.

(57) ABSTRACT

An aqueous polyurethane resin having a cationic group in a side chain thereof is obtainable by reacting a polyester polyol, a polyisocyanate, and a diol containing a quaternary N-atom or amino group, the quaternary N-atom or amino group being not present in the carbon chain between the two hydroxyl groups of the diol. The polyester polyol is obtained by reacting an aromatic polycarboxylic acid and a polyol. The polyurethane resin is suitable as a resin in treatment liquids for inkjet printing.

12 Claims, No Drawings

(51) Int. Cl.
      *C09D 175/06*    (2006.01)
      *C09D 175/08*    (2006.01)

(56) References Cited

FOREIGN PATENT DOCUMENTS

| | | |
|---|---|---|
| CN | 104130376 A | 11/2014 |
| CN | 104837637 A | 8/2015 |
| JP | 2002-059638 A | 2/2002 |
| JP | 2006-045509 A | 2/2006 |
| JP | 2011-140560 A | 7/2011 |
| JP | 2015-163678 A | 9/2015 |
| WO | 2014/042652 A1 | 3/2014 |
| WO | WO 2014/039306 A1 | 3/2014 |

OTHER PUBLICATIONS

Van Aert et al., "Liquid Set for Ink Jet Recording", U.S. Appl. No. 16/766,306, filed May 22, 2020.
Van Aert et al., "Aqueous Polyurethane Resin Dispersion", U.S. Appl. No. 16/766,307, filed May 22, 2020.
Loccufier et al., "Aqueous Pigment Inkjet Ink", U.S. Appl. No. 16/766,305, filed May 22, 2020.
Van Aert et al., "Radiation Curable Polyurethane Resin for Ink Jet Ink", U.S. Appl. No. 16/766,308, filed May 22, 2020.

\* cited by examiner

AQUEOUS POLYURETHANE RESIN DISPERSION

CROSS REFERENCE TO RELATED APPLICATIONS

This application is a 371 National Stage Application of PCT/EP2018/082628, filed Nov. 27, 2018. This application claims the benefit of European Application No. 17203985.1, filed Nov. 28, 2017, which is incorporated by reference herein in its entirety.

BACKGROUND OF THE INVENTION

1. Field of the Invention

The present invention relates to an aqueous polyurethane resin dispersion and more specifically to the use of the polyurethane resin in treatment liquids of substrates for ink jet printing with aqueous ink jet inks or treatment liquids of printed images.

2. Description of the Related Art

In recent years, inkjet techniques have been increasingly utilized for industrial printing applications such as displays, posters, bulletin boards, packaging, textile, etc. In such applications durability such as light fastness, water resistance, and wear resistance are important requirements of the printed images and pigment based inks therefore have been developed.

Inks, such as solvent-based inkjet inks using an organic solvent as a vehicle, and ultraviolet curable inkjet inks including a polymerisable monomer as a main component have been used widely in industrial applications.

However, the solvent-based inkjet inks are not environmentally preferable because the solvent is evaporated in the atmosphere. The ultraviolet curable inkjet inks have limited application fields because they may have skin sensitizing properties depending on the monomer used and an expensive ultraviolet irradiation apparatus is required to be incorporated to the main body of a printer.

In view of such background, there have been developed pigment based aqueous inks for inkjet recording capable of being directly used for printing on porous and non-porous substrates and which give less environmental load. These inks are characterized by the presence of a resin which binds the pigments and prevents rubbing off the images from the substrate leading to an improved solvent and scratch resistance.

Usually, an ink-jet recording medium for aqueous ink jet inks includes a substrate such as paper, a plastic film or textile fabric and an ink-jet receiving layer provided thereon.

The layer is formed from an ink-jet receiving agent which mostly contains a water soluble resin such as polyvinyl alcohol, polyvinyl pyrrolidone and the like and any of various additives, in order to prevent bleeding and or ink coalescence caused by the water based ink or improve ink absorbing property. Problems are caused because bleeding and coalescence arises due to insufficient adsorption of the aqueous pigment ink into the ink-jet receiving layer.

Moreover, there is a problem that a printed image made by jetting aqueous ink jet inks has poor waterproof characteristics. The most popular method to improve the waterproof characteristics is a method wherein an ink-jet receiving agent is used which includes an aqueous cationic resin such as a poly(diallyldimethylammonium chloride) in addition to the aforementioned resin in the ink. Waterproof characteristics can be improved by fixing of the pigment of the aqueous ink due to the electrostatic bonding between an anionic group of the pigment in the ink and a cationic group of the water-soluble cationic resin. However, since the water-soluble cationic resin itself tends to be easily dissolved in water, the effect for improving waterproof characteristics was insufficient. Furthermore, these polymers do not crosslink with each other nor form a film, leading to poor physical properties of the printed image.

WO14042652 discloses a fixer fluid to be used for making an ink-receiving layer and comprising a liquid vehicle, a surfactant, and a cationic polymer. The cationic polymer can be selected from the group of quaternized polyamines, dicyandiamide polycations, diallyldimethyl ammonium chloride copolymers, quaternized dimethylaminoethyl (meth)acrylate polymers, quaternized vinylimidizol polymers, alkyl guanidine polymers, alkoxylated polyethylene imines.

JP2015163678A discloses an aqueous pigment composition for printing on a porous substrate such as textile which guarantees an improved washing fastness and rubbing resistance of the images on the fabric. The aqueous composition comprises pigment particles containing a urethane resin obtained by reacting polyester polyols with polyols comprising an ionic or non-ionic group and polyisocyanate.

US2009/0233065 discloses an ink jet pre-treatment liquid containing a cationic polyurethane. The cationic polyurethane is obtained by making use of a chain extending agent having a tertiary amino group, hence bringing a cationic group in the main chain of the resin. The resin assures a good adhesion of the resin to non-porous substrates. Storage stability of the pre-treatment liquid containing the cationic polyurethane is still to be improved.

US2008/0090949 discloses an ink-jet receiving agent including a cationic polyurethane resin aqueous dispersion. The resin provides excellent waterproof characteristics on a coating which is formed after removing water from the dispersion. The tertiary amino group containing polyol having secondary OH-groups will have limited reactivity, limiting the length of the polymer chains and hence reducing the physical properties of the resin such as adhesion, scratch resistance, and mechanical performance. Furthermore, the method of preparation of the cationic polyurethane as disclosed in US2008/0090949 is laborious, since first the tertiary amino group containing polyol needs to be prepared in advance. The incorporation of polyalkylene glycol units is limited into the main chain of the polyurethane, which will lead to inferior properties with respect to colloidal stability of the aqueous resin dispersion.

As described above, there is great need for the development of a treatment liquid of substrates for ink-jet printing with aqueous pigment inks and which show improved storage stability and which can provide an ink-jet receiving layer which is excellent in printing quality (colour density increase, coalescence and bleeding decrease) and which provides printed images showing excellent physical properties (adhesion, waterproof characteristics and solvent resistance) and which can be produced via an efficient synthesis method.

SUMMARY OF THE INVENTION

It is an object of the invention to provide a solution for the above stated problems. The object has been achieved by incorporating a polyurethane resin as defined below into an aqueous treatment liquid.

According to another aspect, the present invention includes an aqueous treatment liquid for inkjet printing, wherein the polyurethane resin is included as a binder.

According to another aspect, the present invention includes an inkjet recording method using the polyurethane resin as defined below.

Other features, elements, steps, characteristics and advantages of the present invention will become more apparent from the following detailed description of preferred embodiments of the present invention. Specific embodiments of the invention are also defined below.

DETAILED DESCRIPTION OF THE PREFERRED EMBODIMENTS

A. Polyurethane Resin

The polyurethane resin of the present invention is characterised by the fact that the polyurethane resin comprises a cationic group in a side chain and a polyester. A polyalkylene oxide may also be present in a side chain of the polyester urethane backbone. Both the cationic group and the polyalkylene oxide increase the dispersibility and colloidal stability of the resin in water. The polyester urethane resin of the invention is obtainable by reacting a polyester polyol containing aromatic moieties with a diol comprising a quaternary N-atom or tertiary amino group being present in a side chain of the carbon chain linking the two hydroxyl groups of the diol and a polyisocyanate.

A.1. Polyester Polyol

The polyester polyol used in the reaction of the invention, is obtained by reacting an aromatic polycarboxylic acid and a polyol. The aromatic polycarboxylic acid is preferably selected form the group of isophthalic acid, terephthalic acid and a combination thereof.

The polyester polyol is a resin formed by an esterification reaction or transesterification reaction between at least one aromatic polycarboxylic acid component and at least one polyol component. Specific examples of the aromatic polycarboxylic acid include dibasic acids such as phthalic acid, isophthalic acid, terephthalic acid, 2,6-Naphthalenedicarboxylic acid, 1,4-naphthalenedicarboxylic acid, 1,5-naphthalenedicarboxylic acid; tri- or higher-valent polybasic acids such as trimellitic acid and pyromellitic acid; and acid anhydrides thereof, for example, phthalic anhydride, trimellitic anhydride, pyromellitic anhydride; and the like. As the aromatic polycarboxylic acid component, one or more dibasic acids selected from the dibasic acids mentioned above, lower alkyl ester compounds of these acids, and acid anhydrides are mainly used. If necessary, a monobasic acid such as benzoic acid, crotonic acid or p-t-butyl benzoic acid; a tri- or higher valent polycarboxylic acid such as trimellitic anhydride, methylcyclohexene tricarboxylic acid or pyromellitic anhydride; or the like can be further used in combination with the polycarboxylic acid component. It is preferred that the polyester is prepared using dicarboxylic acids which give linear polymer chains, in particular 1,4-terephtalic acid copolymers give a better performance regarding colloidal stability in aqueous medium, than phthalic acid anhydride copolymers. Besides terephthalic acids, one could use also other para- or linear substituted polycarboxylic acids to obtain the desired properties such as 2,6-naphthalenedicarboxylic acid or 1,5-naphthalenedicarboxylic acid.

The preferred carboxylic acid is an aromatic dicarboxylic acid such as terephthalic acid and isophthalic acid. The content of aromatic acids within the resin is equal to or higher than 30 mol % and preferably equal to or higher than 50 mol % with respect to the total amount of dicarboxylic acids or anhydrides. Treatment liquids comprising polyurethane resins obtained by reaction of polyesters polyols containing aromatic polycarboxylic acids do show an improved colloidal stability and lead to images with an improved solvent resistance and an improved dry and wet scratch resistance. The good results obtained with terephthalic acids and isophthalic acids has probably to do with obtaining a certain amount of crystallinity of the polyurethane resin or providing linear amorphous chains which contribute more to the desired physical properties such as scratch resistance and solvent resistance. Introducing phthalic acid anhydride or isophthalic acid in terephthalic acid based polyesters reduces the crystallinity or chain end-to-end distance and improves the solubility in organic solvents.

For terephthalic acid based polyester polyols, it is preferred to use copolymers of terephthalic acid with isophthalic acid, more preferably having at least 20 mol % isophthalic acid. For the same reason polyester polyols with only phthalic acid anhydride are less preferred than copolymers where terephthalic acid is incorporated. Polyester polyols based on only phtalic acid anhydride could be very soluble in the polymerization solvent for the PU preparation, but a dried coating will have also a lower solvent resistance. Therefore, it is preferred that the aromatic polyester polyol contains between 20 and 80 mol % of terephthalate groups on the basis of the total amount of dicarboxylic acids (or acid anhydrides) in the polyester polyol.

Very suitable polyester polyols containing terephthalic ester units and isophthalic ester units in a ratio of 1:1 mol % are: Dynacoll 7150 supplied by Evonik, Marl, Germany, Vylon 220 from Toyobo, Osaka Japan and Elitel 1401 obtained from Unitika Ltd Dusseldorf Germany.

In order to obtain the desired properties of the polyester polyol and using a high content of terephthalic acid, one could use also a mixture of dicarboxylic acids. For example, to reduce the crystallinity one could use a mixture of terephthalic acid and adipic acid. Consequently, one could use also polyester polyols based on a mixture of aromatic polycarboxylic acids and aliphatic dicarboxylic acids such as adipic acid, succinic acid, methylcyclohexene tricarboxylic acid, fumaric acid and sebacic acid or anhydrides such as tetrahydrophthalic acid anhydride, hexahydrophtalic acid anhydride, maleic acid anhydride and succinic acid anhydride.

Polyester polyols with a high content of terephthalic acid could have a poor solubility in the preparation solvent (e.g. acetone) for the PU preparation or could have a too high degree of crystallinity in order to get good adhesive properties. In particular, this is the case when only non-branched diols are used for the polyester polyol, such as 1,2-ethylene glycol or 1,4-butane diol. When using terephthalic acid based polyester polyols with more than 35 mol % terephthalic acid, one can preferably use a mixture of different non-branched diols (e.g. a mixture of 1,2-ethylene glycol and 1,4-butane diol) or a mixture of a non-branched diol (e.g. ethylene glycol) with a branched diol (e.g. neopentyl glycol). When using mixtures of different diols for the polyester polyol, one could use high terephthalic acid contents, even up to 100 mol % based of the total dicarboxylic acid content.

Specific examples of the polyol component include diols such as ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. For the polyol component, diols as mentioned above are mainly used, and if necessary, tri- or higher-valent polyols such as glycerin, trimethylolethane, trimethylolpropane and pentaerythritol can be further used in combination with the diols. Aromatic diols can also be used to increase the content of aromatic moieties in the polyester polyol. Suitable aromatic diols are: p-xylene glycol, 1,5-naphthalenedimethanol, 1,4-naphthalenedimethanol, 4,4'-bis(hydroxymethyl)biphenyl, bis(hydroxyethyl) terephthalate, bis(2-hydroxypropyl) terephthalate, 1,5-naphthalenedicarboxylic acid 1,5-bis(2-hydroxyethyl) ester, 4,4-bis(hydroxymethyl) diphenylmethane, 2,2-bis(4-β-hydroxyethoxyphenyl)propane (diethoxylated bisphenol A) and bis[p-(2-hydroxyethoxy)phenyl]methane.

Preferably diols with a Mw equal to or less than 400 are used together with the polyester polyol. These polyols can be used singly or as mixture of two or more kinds.

A.2. Diols Containing an Amino Group or Cationic Group

Examples of the cationic group in the polyurethane resin of the invention can be selected from protonated amines, protonated nitrogen containing heteroaromatic compounds, quaternized tertiary amines, N-quaternized heteroaromatic compounds, sulfoniums and phosphoniums, quaternized tertiary amines and N-quaternized heteroaromatic compounds being more preferred.

The diol to be used for obtaining the polyurethane resin of the invention contains a quaternary N-atom or amino group, the quaternary N-atom or tertiary amino group being present in a side chain of the carbon chain linking the two hydroxyl groups of the diol. The quaternary N-atom or amino group is hence not present in the carbon chain between the two hydroxyl groups of the diol.

Preferably a diol is used containing an amino group, preferably a tertiary amino group, ie a precursor for obtaining a cationic group after protonation using an acid, e.g. acetic acid. The amino group and more preferably the tertiary amino group is not present in the chain between the two hydroxy groups of the diol. Hence the amino group and more preferably the tertiary amino group or quaternary ammonium group is present in the side chain of the prepared polyurethane resin. After preparation of the polyurethane in a solvent like acetone, the amino group and preferably tertiary amino group is converted to a quaternary ammonium group by protonation with an acid, e.g. acetic acid. Subsequently water is added during a high shear treatment or stirring to obtain an aqueous dispersion. Subsequently the organic solvent (e.g. acetone) may be removed by distillation under reduced pressure.

Examples of suitable diols having a N-atom in the side chain for introducing a cationic group in the resin are: 2-[(Dimethylamino)methyl]-1,3-propanediol, CAS Registry Number 69040-18-2, 2-Methyl-2-dimethylaminomethyl-1,3-propanediol, CAS Registry Number 36254-31-6, 2-Ethyl-2-dimethylaminomethyl-1,3-propanediol, CAS Registry Number 25941-41-7, 2-Diethylaminoethyl-2-methyl-1,3-propanediol, CAS Registry Number 29006-31-3, 2-Diethylaminomethyl-2-ethyl-1,3-propanediol, CAS Registry Number 26102-95-4, 3-[methyl(phenylmethyl)amino]-1,2-propanediol, CAS Registry Number 60278-98-0. Diols having a N-atom in the side chain have the advantage that the colloidal stabilisation of the produced polyurethane resin is further improved with respect to the diols having a N-atom in the main chain.

When using a tertiary amino group containing diol, the amino group is converted to a cationic group by protonation using an inorganic or organic acid. Examples of inorganic acids are hydrochloric acid, perchloric acid, sulphuric acid, hydrobromic acid, hydroiodic acid, phosphoric acid, nitric acid, boric acid, etc. Examples of organic acids include: acetic acid, formic acid, propionic acid, citric acid, oxalic acid, ascorbic acid, lactic acid, benzoic acid, toluene sulphonic acid, phenol, salicylic acid, acrylic acid, maleic acid, itaconic acid, stearic acid, glutamic acid, sulfoethyl methacrylate, carboxyethyl acrylate 2-acrylamido-2-methyl-1-propanesulfonic acid, monoacryloyloxyethyl hexahydrophthalate, methacryloyloxyethyl succinate, acryloyloxyethyl succinate or other organic compounds with an acidic proton such as sulphonamides or thiols.

Other examples of quaternary amines are [p-(2,3-Dihydroxypropoxy)phenyl]trimethylammonium bromide=CAS registry number 109732-00-5, [m-(2,3-Dihydroxypropoxy)phenyl]trimethylammonium bromide=CAS registry number 109731-98-8, [2-[p-(2,3-Dihydroxypropoxy)phenoxy]ethyl]trimethylammonium iodide=CAS registry number 110056-43-4 and quarternary amino diols having the quarternary amino group in the side chain, e.g. 2,3-Dihydroxy-N,N,N-trimethyl-1-propanaminium=CAS registry number 44814-66-6.

In a further preferred embodiment, the diol having an amino group is 3-(Dimethylamino)-1,2-propanediol.

A.3. Polyether Diol

The polyether diol which can be used in the present invention can be obtained by addition polymerization of an alkylene oxide with at least one compound having two or more active hydrogen atoms. Examples of this compound include ethylene glycol, diethylene glycol, triethylene glycol, propylene glycol, trimethylene glycol, 1,3-butanediol, 1,4-butanediol, 1,6-hexanediol, glycerol, trimethylolethane and ethylolpropane. Examples of the alkylene oxide include ethylene oxide, propylene oxide, butylene oxide, styrene oxide, epichlorohydrin and tetrahydrofuran. Preferred polyether diols are compounds according to Formula 1.

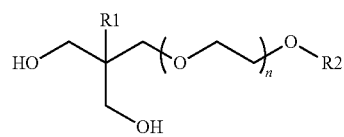

wherein R1 is methyl or ethyl, R2 is H or $C_1$-$C_4$ alkyl and n represents an integer from 5 to 50, more preferably from 10 to 40 and most preferably from 15 to 30.

The polyether diol which can be preferably used in the present invention, is Ymer N120 or Tegomer D 3403, i.e. α-[2,2-bis(hydroxymethyl)butyl]-ω-methoxy-Poly(oxy-1,2-ethanediyl). These diols can be prepared from trimethylol propane oxetane (TMPO). A possible synthesis procedure is described by Fock, J.; Möhring, V., Polyether-1,2- and -1,3-diols as macromonomers for the synthesis of graft copolymers, 1. Synthesis and characterization of the macromonomers. *Die Makromolekulare Chemie* 1990, 191 (12), 3045-3057. In general also other polyether 1,2- or 1,3-diols can be used. For a good stability the polyether graft needs to be well water soluble in order to give a good steric stabilisation. In the case of Ymer N120 the polyether is only composed of ethylene oxide segments, but this can also be a copolymer of different alkylene oxides. Furthermore in the current macro-monomer diol the end group is a methoxy group, this end group can also be other end groups such as a hydrophilic end group (such as anionic groups, e.g. carboxylic, sulphate, phosphate, etc. or cationic groups, e.g. quaternary amine groups or precursors for cationic groups e.g. tertiary amino groups) in order to have also electrosteric stabilisation. The content of the polyether diol in the polyurethane resin is preferably 30 wt. % or less, but more than 1 wt. % with respect to the total solid weight of the polyurethane resin, more preferably the polyether diol content is equal to or less than 15 wt. % and more than 2 wt. % with respect to the polyurethane resin. A content of the polyether diol of less than 30 wt. %, but more than 1 wt. % with respect to the polyurethane resin, has an additional improvement in scratch resistance and solvent resistance of the jetted and dried image with respect to polyether diol content outside this range. Too high polyether diol content (more than 30 wt %) would lead to a too high water solubility and lower glass transition temperature.

A.4. Polyisocyanates

Specific examples of the organic polyisocyanate compound that is reacted with the polyester polyol include aliphatic diisocyanates such as lysine diisocyanate, hexamethylene diisocyanate and trimethylhexane diisocyanate; cyclic aliphatic diisocyanates such as hydrogenated xylene diisocyanate, isophorone diisocyanate, methylcyclohexane-2,4 (or 2,6)-diisocyanate, 4,4'-methylenebis(cyclohexyl isocyanate) and 1,3-(isocyanatomethyl)cyclohexane; aromatic diisocyanates such as tolylene diisocyanate, xylene diisocyanate and diphenylmethane diisocyanate; organic polyisocyanates themselves, including tri- or higher-valent polyisocyanates such as lysine triisocyanate; adducts each composed of such an organic polyisocyanate with a polyhydric alcohol, a low molecular weight polyester resin or hydrogen; and cyclised polymers (for example, isocyanurate), biuret type adducts and the like, each formed from various diisocyanate compounds mentioned above.

It is preferable, from the viewpoint of storage stability of the treatment liquid composition, that the organic polyisocyanate compound according to the invention include at least one selected from non-yellowing type polyisocyanate compounds such as isophorone diisocyanate, hexamethylene diisocyanate and lysine diisocyanate, and it is more preferable that the organic polyisocyanate compound include at least isophorone diisocyanate.

Furthermore, the organic polyisocyanate compounds can be used singly alone or as mixtures of two or more kinds.

A.5. Reaction Conditions

With regard to the conditions for the reaction between the polyester polyol, the polyol containing a cationic group and the organic polyisocyanate compound, those conventionally used reaction conditions can be used without particular limitation.

Besides the preferred terephthalate and/or isophthalate containing polyester polyols also a mixture of different polymeric polyols can be used to adjust the physical properties, adhesion, mechanical performance, etc. Examples are e.g. polycarbonate polyols, polyether polyols, polyacrylate polyols, aliphatic polyester polyols, polyolefin polyols or other polymeric polyols. Examples of polycarbonate polyols are e.g. Oxymer C112, Oxymer M112 (available via Perstorp), Kuraray polyol C-2050, C-2090, C-1090 (available from Kuraray), Converge HMA-1 and Converge HMA-1 (available from Novomer Inc.), Duranol T6002, T6001, T5652, T5651, T5650J, T4672, T4671, T4692 and T4691 (available from Asahi kasei). Additional aliphatic polyester polyols, are e.g. regular (semi)crystalline or amorphous grades, e.g. based on hexane diol adipates (e.g. Dynacoll 7372 from Evonik) but also polyester polyols based on natural products such as polyester polyols made by using dimer acid or dimer diols (e.g. trade name Priplast from Croda), examples are Priplast 3192 and Priplast 1838. The raw material used to prepare certain Priplast grades, i.e. dimer diols with trade name Pripol can also be used as monomer in the PU synthesis to modify the physical properties and adhesive properties.

In the reaction between the polyester polyol and the organic polyisocyanate compound, if necessary, a diol with Mw equal to or less than 400 can be used. Examples of suitable diols are: ethylene glycol, diethylene glycol, propylene glycol, dipropylene glycol, 1,4-butanediol, neopentyl glycol, 1,5-pentanediol, 3-methyl-1,5-pentanediol, 1,4-hexanediol and 1,6-hexanediol; and tri- or higher-valent polyols such as glycerin, trimethylolethane, trimethylolpropane and pentaerythritol. 1,4-butane diol is most preferred.

In the polyurethane synthesis different high molar mass polyols and low molecular weight diols can be reacted, besides the polyether diols used for stabilization of the polyurethane dispersion. In the procedure used, the stabilizing polyols and the polyester polyol (Mw>400 g/mol) are reacted with in excess of isocyanate. This enables a good conversion of the reaction. Depending on the molecular weight and the copolymer composition, the polyester polyol, may have a poor solubility in the reaction solvent (e.g. acetone). Also the polyol with the anionic group has a poor solubility in acetone. After reacting using an excess of isocyanate, the excess is compensated to a NCO/OH molar ratio by addition of a low molecular weight diol, which would lead to a polyurethane resin with very low amount of residual isocyanate. In case some residual isocyanate is present some urea bonds could be formed. Examples of suitable diols are given above.

So in the reaction conditions used a pre-condensation step with NCO/OH-ratio>1 and a chain extension step at NCO/OH-ratio=1.0 can be distinguished. Instead of using a 2-step process, one could use also a one-step or semi-continuous process. In the 2-step process, when using a high NCO/OH ratio more low molar mass diol (chain extender) is added and the weight ratio of the polyester polyol is reduced. In order to obtain the desired properties, the amount of polyester polyol as compared to low molar mass diols should be considerably higher, i.e. at least 50 wt. %. Surprisingly it was found that upon using high NCO/OH ratios in the pre-condensation step this resulted into polyurethane dispersions with poorer colloidal stability because of more coarse particles leading to an ink jet ink having poorer filterability. Reacting at a higher NCO/OH ratio in the pre-condensation step will lead also to a higher content of urethane units, which are able to form hydrogen bonds. When keeping the type of polyester polyol constant and also the chain extender, reacting at an NCO/OH ratio more close to NCO/OH=1.0, leads to better colloidal stability and better filtration properties of the formulated ink jet ink. Consequently when the NCO/OH ratio and the amount of urethane bonds play an important role, also the molecular weight of the polyester polyol and the low molar mass diol plays a role. In the most examples only one polyester polyol is used and only one low molar mass diol. When using mixtures of diols one can easily calculate the number average molecular weight which will affect the NCO/OH ratio.

Examples of the organic solvent used for the reaction between the polyester polyol, the polyether diol, the polyol comprising a cationic group and the organic polyisocyanate compound, here include ketones such as acetone and methyl ethyl ketone, ethers such as tetrahydrofuran and dioxane, acetates such as ethyl acetate and butyl acetate, nitriles such as acetonitrile, and amides such as dimethyl formamide, N-methylpyrrolidone and N-ethylpyrrolidone. These may be used singly or in combinations of two or more.

Using higher molecular weight polyols than Ymer120N will give more phase separation, providing a better water dispersibility. However, for the making of the polyurethane resin, it is more difficult to dissolve these polyols in an organic solvent, e.g. acetone. This can be overcome by using a co-solvent during the polycondensation reaction. A preferred co-solvent is 2-pyrolidon or N-methylpyrrolidone, more preferably 2-pyrolidon.

The treatment liquid composition of the invention contains the polyurethane resin as an essential component. Therefore, the polyurethane resin is preferably dispersed in water to obtain an aqueous dispersion of the polyurethane resin. Every dispersing technology suitable for preparing an aqueous dispersion may be used.

B. Treatment Liquid Composition

The treatment liquid according to the present invention contains the polyurethane resin as described in § A, and water. Additional components which may be added to the treatment liquid are given below. The amount of polyurethane resin in the treatment liquid is equal to or lower than 30 wt. %. The treatment liquid can be applied onto the substrate or to the printed images by means of a coating technique, a spraying technique or a jetting technique.

B.1. Water Soluble Organic Solvent

The treatment liquid of the invention may contain, besides water as a solvent, also a water-soluble organic solvent. Examples of water-soluble organic solvents include polyhydric alcohols such as diethylene glycol, triethylene glycol, dipropylene glycol, 1,3-propanediol, 1,3-butanediol, 1,4-butanediol, 2,2-dimethyl-1, 3-propanediol, 2-methyl-1, 3-propanediol, propanediol, 1,2-pentanediol, 2,4-pentanediol, 1,5-pentanediol, 1,6-hexanediol, 2-ethyl-1, 3-hexanediol, 1,2-hexanediol and 2,5-hexanediol, polyhydric alcohol alkyl ethers such as dipropylene glycol n-propyl ether, tripropylene glycol methyl ether, tripropylene glycol n-propyl ether, propylene glycol phenyl ether, triethylene glycol methyl ether, triethylene glycol methyl ether, triethylene glycol ethyl ether, diethylene glycol n-hexyl ether and ethylene glycol phenyl ether, and nitrogen-containing heterocyclic compounds such as 2-pyrrolidone and N-methylpyrrolidone.

Other preferred water soluble organic solvents include ethylene glycol, propylene glycol, 1,2-butanediol, 2,3-butanediol, 2-methyl-2, 4-pentanediol, dipropylene glycol monomethyl ether, propylene glycol n-butyl ether, propylene glycol t-butyl ether, diethylene glycol methyl ether, ethylene glycol n-propyl ether and ethylene glycol n-butyl ether.

The content of the water-soluble organic solvent, in the aqueous ink jet ink is preferably less than 70 wt. %. If the content exceeds 70% by mass, the ink loses its water based, hence more green character.

B.2. Surfactant

In the treatment liquid of the present invention, a surfactant may be added in order to ensure wettability onto the substrate. The amount of the surfactant added is preferably 0.1 wt. % to 5 wt. % as an active component in the ink.

If the amount added is below 0.1% by mass, wettability onto the substrate is not sufficient and causes degradation in image quality and in adhesion to the substrate. The surfactant that can be used is not particularly limited as long as it satisfies the above limitation.

While any of an amphoteric surfactant, a non-ionic surfactant, or a cationic surfactant can be used, non-ionic surfactants such as polyoxyethylene alkyl phenyl ether, polyoxyethylene alkyl ester, polyoxyethylene alkylamine, polyoxyethylene alkyl amide, a polyoxyethylene propylene block polymer, sorbitan fatty acid ester, polyoxyethylene sorbitan fatty acid ester and an ethylene oxide adduct of acetylene alcohol are preferably used in terms of a relationship between dispersing stability and image quality. In addition, a fluorine-based surfactant and a silicon-based surfactant can be used in combination (or singly) depending on formulation.

Suitable surfactants are siloxane based surfactants such as Tego Twin 4000 from Evonik Industries, Tegowet 270 from Evonik industries, Hydropalat WE3220 from BASF, silane based surfactants such as Silwet HS312 from Momentive and fluor containing surfactants such as: Thetawet FS8150 from Neochem GMBH, Capstone FS3100 from Dupont, Tivida FL2500 from Merck and surfactants from the Dynol, Envirogem & Surfynol series from Air products.

B.3. Additives

Together with the polyurethane resin, a multivalent metal ion can be contained in the treatment liquid. Suitable examples are water-soluble metal salts formed from bi- or higher valent metal cations, such as magnesium, calcium, strontium, barium, zirconium, and aluminum, and anions, such as a fluoride ion ($F^-$), a chloride ion ($Cl^-$), a bromide ion ($Br^-$), a sulfate ion ($SO_4^{2-}$), a nitrate ion ($NO_3^-$), and an acetate ion ($CH_3COO^-$).

These polyvalent metal ions have a function of aggregating ink by acting on anionic groups such as the carboxyl groups on the surface of the pigment or the dispersed polymer of capsules contained in the ink. As a result, the ink remains on the surface of the substrate to improve the colour-developing property. Therefore, it is preferred that the surface of the pigment in the ink and/or the dispersed polymer of the capsules contained in the ink have an anionic group selected from the group of carboxyl group, sulfonate group and phosphonate group, most preferably carboxyl group.

The treatment liquid may also contain organic acids. Preferred examples of the organic acids include, but are not limited to acetic acid, propionic acid, and lactic acid.

The treatment liquid may also contain colorants, such as pigments. Particularly useful for printing on dark textile is a treatment liquid containing a white pigment. The preferred pigment for the aqueous treatment liquid ink is titanium dioxide. Titanium dioxide ($TiO_2$) pigment useful in the present invention may be in the rutile or anatase crystalline form. Processes for making $TiO_2$ are described in greater detail in "The Pigment Handbook", Vol. I, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the treatment liquid. For applications demanding high hiding or decorative printing applications, the titanium dioxide particles preferably have an average size of less than about 1 μm. Preferably, the particles have an average size of from about 50 to about 950 nm, more preferably from about 75 to about 750 nm, and still more preferably from about 100 to about 500 nm.

In addition, unique advantages may be realized with multiple particle sizes, such as opaqueness and UV protection. These multiple sizes can be achieved by adding both a pigmentary and a nano grade of $TiO_2$.

The titanium dioxide pigment may also bear one or more metal oxide surface coatings. These coatings may be applied using techniques known by those skilled in the art. Examples of metal oxide coatings include silica, alumina, alumina-silica, boria and zirconia, among others. These coatings can provide improved properties including reducing the photoreactivity of the titanium dioxide. Metal oxide coatings of alumina, aluminasilica, boria and zirconia result in a positive charged surface of the TiO$_2$ pigments and hence are particularly useful in combination with the cationic stabilised capsules of the invention because no additional surface treatment of the pigment is required.

Commercial examples of such coated titanium dioxides include R700 (alumina-coated, available from E.I. DuPont deNemours, Wilmington Del.), RDI-S (alumina-coated, available from Kemira Industrial Chemicals, Helsinki, Finland), R706 (available from DuPont, Wilmington Del.) and W-6042 (a silica alumina treated nano grade titanium dioxide from Tayco Corporation, Osaka Japan). Other suitable white pigments are given by Table 2 in [0116] of WO 2008/074548. The white pigment is preferably a pigment with a refractive index greater than 1.60. The white pigments may be employed singly or in combination. Preferably titanium dioxide is used as pigment with a refractive index greater than 1.60. Suitable titanium dioxide pigments are those disclosed in [0117] and in [0118] of WO 2008/074548.

C. Application Method of the Treatment Liquid

The treatment liquid according to the present invention is suitable for treating different substrates, porous and non-porous ones. Porous substrates include paper, card board, white lined chipboard, corrugated board, packaging board, wood, ceramics, stone, leather and textile. Non-porous substrates include metal, synthetic leather, glass, polypropylene, polyvinylchloride, PET, PMMA, polycarbonate, polyamide, polystyrene or co-polymers thereof. The treatment liquid according to the present invention is also suitable for treating jetted images, commonly known as post treatment fluid.

All well-known conventional methods can be used for coating or impregnating the treatment liquid on a substrate or on a image formed by jetting an aqueous inkjet ink. Examples of the method include air knife coating, blade coating, roll coating, gravure coating. After applying the treatment liquid onto a substrate, the coating is preferably dried before printing the image onto the treated substrate.

The treatment liquid is particularly suitable for treating non-porous substrates, before or after printing images with inkjet printing.

The treatment liquid is also suitable for treating textile fabrics. The textile fabric used is made of one type of fibre or blended fibre of two or more selected from the group consisting of cotton, hemp, rayon fibre, acetate fibre, silk, nylon fibre, and polyester fibre. The fabric may be in any form, for example, a woven, knitted, or nonwoven form of the above-mentioned fibres. The treatment liquid containing the polyurethane resin according to the invention can be preferably applied to the fabric by spraying, coating, padding or pad printing.

Alternatively, the pre-treatment liquid may also be applied to the fabric using an ink jet head or valve jet head. This means of applying the treatment liquid has the advantage that the amount of required treatment liquid is substantially lower than with the other application methods. By means of a jetting head, it is possible to apply treatment liquid onto areas of the fabric where the image should be printed. Suitable ink jet head types for applying the treatment liquid are piezoelectric type, continuous type, thermal print head type or valve jet type.

Fabric to which the treatment liquid has been applied may be dried and optionally undergo a heat treatment, before the subsequent ink jetting step with the pigment containing ink. Examples of the heating process include, but are not limited to, heat press, atmospheric steaming, high-pressure steaming, and THERMOFIX. Any heat source can be used for the heating process; for example, an infrared ray lamp is employed.

In another preferred embodiment of the invention, the treatment liquid, after having been applied onto a substrate, is not substantially dried before the image is printed by means of the jetting of the aqueous ink jetting step.

EXAMPLES

Measurement Methods
1. Viscosity

The viscosity of the treatment liquids was measured at 32° C. using a "Robotic Viscometer Type VISCObot" from CAMBRIDGE APPLIED SYSTEMS.

2. Storage Stability

Treatment liquid stability was evaluated numerically and visually. If the relative viscosity of the treatment liquid increases more than 40% after being stored for 2 weeks at 60° C. the treatment liquid is called unstable. If the treatment liquid solidifies, the treatment liquid is called unstable.

Materials

All materials used in the following examples were readily available from standard sources such as Sigma-Aldrich (Belgium) and Acros (Belgium) unless otherwise specified. The water used was demineralised water.

Acetone is acetone p.a. supplied by VWR International

Vylon 220 is a polyester polyol containing terephthalic ester and isophthalic ester units obtained from Toyobo Ymer N120 is 1,3 diol polyether supplied by Perstorp DBTL is dibutyl tin laurate (KEVER-KAT DBTL 162) supplied by Brenntag IPDI is a Vestanat IPDI, isocyanate supplied by Evonik BD is 1,4-butane diol supplied by Acros Triethylamine is triethylamine supplied by Acros Disperbyk 190 is a 40 wt. % solution of dispersing agent supplied by BYK CHEMIE GMBH Imagisperse is a TiO$_2$-dispersion supplied by Imagico India and available under the trade name Imagisperse Aqua White PYR is 2-pyrrolidone.

HD is 1,2-hexanediol

Proxel K is an aqueous solution of 5-10% 1,2-Benzisothiazolin-3-one

SURF-1 is Capstone FS3100, a surfactant from Dupont

SURF-2 is Tego Twin 4000, a surfactant from Evonik Industries

SUBSTR-1 is Metamark MD5-100 (PVC)

Preparation of Polyurethane Resin Dispersions

PU-1 (INV)

In an Erlenmeyer of 500 ml the following compounds were weighed: 104.22 g of Vylon 220, 15.30 g of Ymer N120 and 201.45 g of acetone. The Ymer N120 was pre-heated in an oven at 80° C., in order to obtain a liquid which can be easily handled. The mixture weighed in the Erlenmeyer was stirred using a magnetic stirrer and heated to 45° C. A clear solution was obtained and cooled to room temperature which will be later on used in the reaction. In a 500 ml 3 necked round bottom flask equipped with a coiled condenser and stirrer, 4.61 g of 3-(Dimethylamino)-1,2-propanediol was added. The prepared polyol solution (Vylon 220+Ymer N120) was added to 3-(Dimethylamino)-1,2-propanediol present in the 500 ml 3 necked round bottom flask. 1.07 g of DBTL was diluted in 9.67 g of acetone and also added to the polyol mixture. Then the reactor was heated to 55° C. during appr. 35 minutes, allowing the 3-(Dimethylamino)-1,2-propanediol to dissolve homogenously. Subsequently 34.04 g of IPDI was added dropwise via an addition funnel with pressure equalization arm during 20 minutes. The amount isocyanate added was an excess towards the hydroxyl amount, ie. NCO/OH=1.53). The reaction was allowed to take place during 2 hours at 55° C. The isocyanato terminated prepolymer and free IPDI which was available in excess was then further reacted using a diol as chain extender. As diol 4.78 g of BD was used. The reaction mixture was cooled to 40° C., in order to avoid evaporation of acetone. The reaction mixture was then allowed to react overnight during 20 hours at 40° C. s in order to reach full conversion. The tertiary amine group in the resin was protonated by adding 2.32 g of acetic acid to the resin solution.

From the protonated PU solution, 345.17 g (44.03% solids) was weighed in a stainless steel vessel. Subsequently the water based dispersion was made using Disperlux equipment adding water during high shear mixing. Under stirring at 900 RPM using a 9 cm diameter dissolver stirrer 282.27 g of water was added during 20 minutes to the acidified PU solution. The acetone in the obtained dispersion was evaporated on a rotary evaporator. In order to avoid foaming the evaporation was started at a lower vacuum. The evaporation was stopped when also water was evaporated at a pressure of 60 mbars and a 40° C. heating bath. Based on the weight the concentration was corrected by adding water to 35%. The obtained PU-dispersion showed an excellent colloidal stability. The exact solid content was determined by drying 1 g of solution on an aluminum dish at 130° C. during 120 minutes. The solid content obtained was 34.96 wt. %. The measured pH is 5.04. Particle size measurement using Zetasizer: 31 nm.

PU-2 (INV)

In an Erlenmeyer of 500 ml the following compounds were weighed: 107.39 g of Vylon 220 and 201.45 g of acetone. The Erlenmeyer was stirred using a magnetic stirrer and heated to 45° C. A clear solution was obtained and cooled to room temperature which will be later on used in the reaction. In a 500 ml 3 necked round bottom flask equipped with a coiled condenser and stirrer, 8.95 g of 3-(Dimethylamino)-1,2-propanediol was added. The prepared polyol solution (Vylon 220) was added to 3-(Dimethylamino)-1,2-propanediol present in the 500 ml 3 necked round bottom flask. 1.07 g of DBTL was diluted in 9.67 g of acetone and also added to the polyol mixture. Then the reactor was heated to 55° C. during appr. 35 minutes, allowing the 3-(Dimethylamino)-1,2-propanediol to dissolve homogenously. Subsequently 41.82 g of IPDI was added dropwise via an addition funnel with pressure equalization arm during 20 minutes. The amount isocyanate added was an excess towards the hydroxyl amount, ie. NCO/OH=1.53). The reaction was allowed to take place during 2 hours at 55° C. The isocyanato terminated prepolymer and free IPDI which was available in excess was then further reacted using a diol as chain extender. As diol 4.78 g of BD was used. The reaction mixture was cooled to 40° C., in order to avoid evaporation of acetone. The reaction mixture was then allowed to react overnight during 20 hours at 40° C. s in order to reach full conversion. The tertiary amino group in the resin was protonated by adding 4.51 g of acetic acid to the resin solution.

From the protonated PU solution, 353.87 g (44.50 wt.% solids) was weighed in a stainless steel vessel. Subsequently the water based dispersion was made using Disperlux equipment adding water during high shear mixing. Under stirring at 900 RPM using a 9 cm diameter dissolver stirrer 292.48 g of water was added during 20 minutes to the acidified PU solution. The acetone in the obtained dispersion was evaporated on a rotary evaporator. In order to avoid foaming the evaporation was started at a lower vacuum. The evaporation was stopped when also water was evaporated at a pressure of 60 mbars and a 40° C. heating bath. Based on the weight the concentration was corrected by adding water to 35%. The obtained PU-dispersion showed an excellent colloidal stability. The exact solid content was determined by drying 1 g of solution on an aluminum dish at 130° C. during 120 minutes. The solid content obtained was 34.60 wt. %. The measured pH is 4.90. Particle size measurement using Zetasizer: 33 nm.

Example 1

This example illustrates the need for a polyurethane resin obtained by reacting a polyester polyol and a diol containing a cationic group or a precursor of a cationic group such as tertiary amino group in order to assure sufficient storage stability of a treatment liquid and at the same time preserve excellent physical properties of the dried treatment liquid. The presence of a polyol containing a cationic group during the reaction implies that this compound is built in the PU-resin.

Preparation of Treatment Liquids

Treatment liquids were prepared by mixing the compounds given in Table 1. All weight percentages are relative to the total weight of the inkjet ink.

TABLE 1

| Compound | PTL-1 (INV) Content in wt. % | PTL-2 (INV) Content in wt. % |
| --- | --- | --- |
| PU-1 (INV) | 85.81 | — |
| PU-2 (INV) | — | 86.71 |
| SURF-1 | 1.0 | 1.0 |
| Water | To complete to 100% | To complete to 100% |

Evaluation and Results

All treatment liquids comprising the inventive PU-resins show a good storage stability.

Example 2

This example shows that treatment liquids wherein the PU-resin according to the invention is combined with white pigments show an excellent storage stability.

Preparation of a White Pigment Dispersion 275 g of white pigment (TRONOX CR 834) was added to a mixture of 68.75 g of Disperbyk 190 and 2.2 g of Proxel K in 204.05 g of water under high shear by means of a Disperlux. 200 g 0.4 mm yttrium stabilized zirconia beads ("high wear resistant zirconia grinding media" from TOSOH Co.) was added and the white pigment was milled for 75 minutes in a Dynomill Research Lab at a flow of 4500 t/min. The zirconia beads were removed by filtration and the dispersion was filtered over a 0.7 μm filter. The dispersion WIT-1 had an average particle size of 219 nm.

Preparation of the Treatment Liquids PTL-3 and PTL-4

Treatment liquids PTL-3 and PTL-4 were prepared by mixing the compounds given in Table 2.

All weight percentages are relative to the total weight of the inkjet ink.

TABLE 2

| Compound | PTL-3 Content in wt. % | PTL-4 Content in wt. % |
|---|---|---|
| PU-2 (INV) | 34.32 | 34.32 |
| Imagisperse | 27.50 | — |
| WIT-1 | — | 22.00 |
| PYR | 15.0 | 15.0 |
| HD | 15.0 | 15.0 |
| SURF-1 | 0.6 | 0.6 |
| SURF-2 | 0.2 | 0.2 |
| Water | To complete to 100% | To complete to 100% |

Both treatment liquids show an excellent storage stability, showing that the PU-resins according to the invention can be combined with white pigments without causing storage stability problems in the treatment liquid.

The invention claimed is:

1. An aqueous polyurethane resin dispersion comprising:
   a polyurethane resin obtained by reacting a polyester polyol, a polyisocyanate, and a diol including a quaternary N-atom or a tertiary amino group; wherein
   the quaternary N-atom or the tertiary amino group is present in a side chain of a carbon chain linking two hydroxyl groups of the diol and at least one of the hydroxyl groups is bonded to a primary carbon; and
   the polyester polyol is obtained by reacting a polyol and an aromatic polycarboxylic acid selected from the group consisting of terephthalic acid, isophthalic acid, and a combination thereof.

2. The aqueous polyurethane resin dispersion according to claim 1, wherein an amount of the isophthalic acid in the polyester polyol is at least 20 mol %.

3. The aqueous polyurethane resin dispersion according to claim 1, wherein a polyether diol is present during the reaction of the polyester polyol, the polyisocyanate, and the diol.

4. The aqueous polyurethane resin dispersion according to claim 2, wherein a polyether diol is present during the reaction of the polyester polyol, the polyisocyanate, and the diol.

5. The aqueous polyurethane resin dispersion according to claim 3, wherein the polyether diol is a compound according to Formula 1:

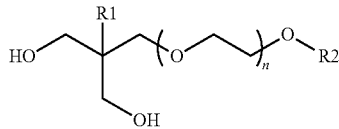

Formula 1 wherein
R1 is methyl or ethyl;
R2 is $C_1$-$C_4$ alkyl; and
n represents an integer from 5 to 50.

6. The aqueous polyurethane resin dispersion according to claim 5, wherein the polyether diol is α-[2,2-bis(hydroxymethyl)butyl]-ω-methoxy-Poly(oxy-1,2-ethanediyl).

7. The aqueous polyurethane resin dispersion according to claim 1, wherein the diol containing the quaternary N-atom or the tertiary amino group is 3-(Dimethylamino)-1,2-propanediol.

8. An aqueous treatment liquid for ink jet printing comprising:
   the aqueous polyurethane resin dispersion as defined in claim 1.

9. The aqueous treatment liquid for ink jet printing according to claim 8, further comprising:
   a pigment.

10. The aqueous treatment liquid for ink jet printing according to claim 9, wherein the pigment includes titanium dioxide.

11. An inkjet recording method comprising:
    providing a substrate;
    applying the aqueous treatment liquid as defined in claim 8 on a surface of the substrate, and optionally drying the aqueous treatment liquid; and
    printing an image by jetting an ink jet ink onto the substrate.

12. The inkjet recording method according to claim 1, wherein the aqueous treatment liquid includes a titanium dioxide pigment.

* * * * *